(12) United States Patent
Doczy et al.

(10) Patent No.: US 7,872,872 B2
(45) Date of Patent: Jan. 18, 2011

(54) CARD-BASED POWER SYSTEM FOR AN ELECTRONIC DEVICE

(75) Inventors: Paul J. Doczy, Cypress, TX (US); Jonathan R. Harris, Cypress, TX (US); Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/881,937

(22) Filed: Jul. 30, 2007
(Under 37 CFR 1.47)

(65) Prior Publication Data
US 2009/0034211 A1 Feb. 5, 2009

(51) Int. Cl.
*H05K 7/10* (2006.01)

(52) U.S. Cl. .......... 361/737; 439/946; 307/150

(58) Field of Classification Search .......... 361/737; 439/945, 946; 235/492; 307/150
See application file for complete search history.

(56) References Cited

U.S. PATENT DOCUMENTS

| | | | | |
|---|---|---|---|---|
| 5,451,933 A | * | 9/1995 | Stricklin et al. ........... 361/737 |
| 5,463,261 A | * | 10/1995 | Skarda et al. ............. 307/131 |
| 5,540,601 A | * | 7/1996 | Botchek .................... 439/502 |
| 5,628,055 A | * | 5/1997 | Stein ....................... 455/575.1 |
| 5,928,336 A | | 7/1999 | Takechi |
| 6,244,894 B1 | * | 6/2001 | Miyashita ................. 439/500 |
| 6,562,510 B1 | * | 5/2003 | Chiang et al. ............. 429/100 |
| 7,152,135 B2 | | 12/2006 | Chou |
| 7,170,257 B2 | * | 1/2007 | Oh ........................... 320/106 |
| 7,182,251 B2 | * | 2/2007 | Tomoeda et al. ........ 235/375 |
| 2003/0094924 A1 | * | 5/2003 | Oh ........................... 320/128 |
| 2005/0110618 A1 | | 5/2005 | Creff et al. |
| 2005/0188003 A1 | | 8/2005 | Teramura et al. |
| 2005/0198423 A1 | | 9/2005 | Hsieh |
| 2005/0251609 A1 | | 11/2005 | Chou et al. |
| 2006/0259651 A1 | | 11/2006 | Liu |
| 2006/0264189 A1 | | 11/2006 | Turner et al. |
| 2007/0032098 A1 | | 2/2007 | Bowles et al. |

FOREIGN PATENT DOCUMENTS

JP 09-244767 9/1997

OTHER PUBLICATIONS

Translation of DE Office Action date May 6, 2010, pp. 4.

* cited by examiner

*Primary Examiner*—Dameon E Levi

(57) ABSTRACT

A computer card comprises a housing insertable into a slot of an electronic device and a power pin configured to provide power to the electronic device.

11 Claims, 2 Drawing Sheets

US 7,872,872 B2

CARD-BASED POWER SYSTEM FOR AN ELECTRONIC DEVICE

BACKGROUND OF THE INVENTION

Some types of electronic devices are configured without a particular connector and/or locking element that would enable the electronic device to be attached to a docking station. To enable such types of electronic devices to be connected to various types of peripheral devices (e.g., a keyboard, a mouse, a printer, a display device, etc.), a computer card (e.g., an express card) may be insertable into a bay of the electronic device such that the various types of peripheral devices are accessible by the electronic device through the computer card. However, such a method and/or device to enable the electronic device to connect to various types of peripheral devices still lack many capabilities provided by conventional docking stations.

DETAILED DESCRIPTION OF THE DRAWINGS

Figure 1:
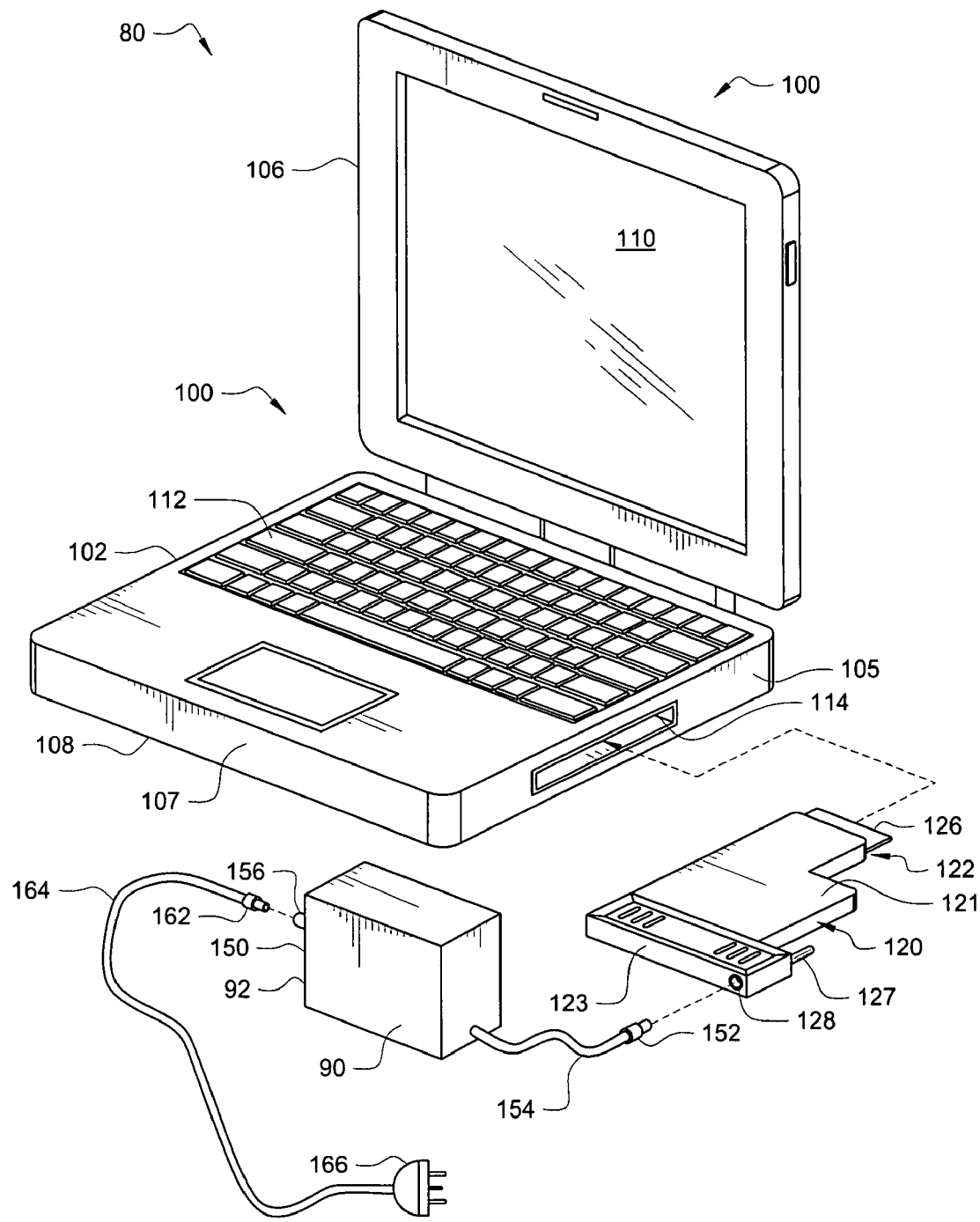
FIG. 1 illustrates an embodiment of a power system for an electronic device.

FIG. 1 illustrates an embodiment of a card-based power system 80 for an electronic device 100. Card-based power system 80 enables an external power source to be coupled and/or connected to electronic device 100 via a computer card, thereby enabling electronic device 100 to connect to a plurality of peripheral devices via the computer card and also providing power to electronic device 100 via the computer card. In the illustrated embodiment, card-based power system 80 comprises a computer card 120 connectable to electronic device 100 and connectable to a dock 150. In the illustrated embodiment, electronic device 100 is a laptop or notebook computer 102. However, electronic device 100 can be any type of electronic device such as, but not limited to, a desktop computer, a laptop computer, a tablet computer, a personal digital assistant (PDA), a cellular phone, a gaming device, or any type of portable or non-portable electronic device. In FIG. 1, electronic device 100 comprises a display member 106 rotably coupled to a base member 108. Display member 106 comprises a display screen 110. Base member 108 comprises a keyboard 112 and a slot 114. Slot 114 comprises an externally accessible bay for receiving computer card 120 therein such that computer card 120 may be slid into and out of slot 114 to engage/disengage computer card 114 relative to electronic device 100. In the illustrated embodiment, slot 114 is disposed along a side 105 of a housing 107 of base member 108; however, it should be understood that slot 114 can be disposed along any edge or surface of display member 106 and/or base member 108. Computer card 120 can be any type of computer card (e.g., a Personal Computer Memory Computer card International Association (PCMCIA) computer card, an ExpressCard, etc.) which can interface with electronic device 100.

In the illustrated embodiment, computer card 120 comprises a housing 121 that comprises an internal portion 122 and an external portion 123. As used herein, the "internal" portion 122 of computer card 120 comprises a portion of computer card 120 that is disposed within slot 114 when computer card 120 is disposed within slot 114, and the "external" portion 123 of computer card 120 comprises a surface or portion of computer card 120 that is accessible and/or exposed from an exterior of electronic device 100 when computer card 120 is disposed within slot 114. A connector 126 is disposed on internal portion 122 for coupling computer card 120 to internal circuitry and/or electronic components of electronic device 100. Connector 126 can accept any type of communications protocol (e.g., Peripheral Component Interconnect Express (PCI Express), Universal Serial Bus (USB), etc.).

In the embodiment illustrated in FIG. 1, computer card 120 comprises a power pin 127 for delivering direct current (DC) power to electronic device 100. Power pin 127 is configured to enable a DC power to be delivered to electronic device 100 from another external device (e.g., a power source, a battery, etc.) to be operatively coupled to electronic device 100 via computer card 120. In operation, when computer card 120 is inserted and disposed within slot 114, power pin 127 is coupled to an internal power circuitry of electronic device 100, thereby enabling DC power to be provided to electronic device 100 via computer card 120. It should be noted, however, that power pin 127 may be embodied as any type of interface component capable of interfacing with internal component(s) of electronic device 100 for delivering power thereto. In the illustrated embodiment, power pin 127 is electrically coupled to an interface port 128 disposed along external portion 123. In some embodiments, interface port 128 provides a connection to which another power-providing device is removably connectable (e.g., an external source of DC power). However, it should be understood that a hard-wired connection may also be attached at and/or near interface port 128 to couple power pin 127 to an external DC power source.

In FIG. 1, dock 150 is a port replicating device configured to enable a plurality of peripheral devices (e.g., a camera, an optical drive, speakers, a microphone, etc.) to communicate with electronic device 100 via computer card 120. In some embodiments, dock 150 is configured to convert an alternating current (AC) power supply to a DC power supply, thereby enabling DC power to be provided to electronic device 100 via computer card 120. In FIG. 1, a connector 152 of dock 150 is communicatively couplable to interface 128 to enable dock 150 to be coupled to computer card 120. In FIG. 1, a cable 154 extends from connector 152 to dock 150; however, it should be understood that dock 150 may be otherwise coupled to interface 128. It should also be understood that interface 128 and/or connector 152 may comprise a permanent non-detachable connector. In some embodiments, cable 154 enables DC power and/or other types of data and/or electrical signals to provided to computer card 120.

In FIG. 1, dock 150 comprises an interface 156 configured to provide a connection to which a power-providing device may be removably coupled, thereby enabling the power-providing device to operatively communicate with electronic device 100 when computer card 120 is inserted and/or disposed within slot 114. In the illustrated embodiment, interface 156 is disposed on a surface 92 of a housing 90 for dock 150; however, it should be understood that interface 156 may disposed on any surface of housing 90. Housing 90 of dock 150 also houses and/or supports one or more other interfaces and/or ports for dock 90 on surface 92 to enable dock 150 to be coupled to a plurality of peripheral devices. In FIG. 1, dock 150 comprises a plug 166 which can be connected to an electrical outlet such that an AC power supply flows from the electrical outlet to dock 150 via a cord 164. It should be understood that, in some embodiments, connector 156 can be permanently and/or hard-wired to dock 150.

Figure 2:
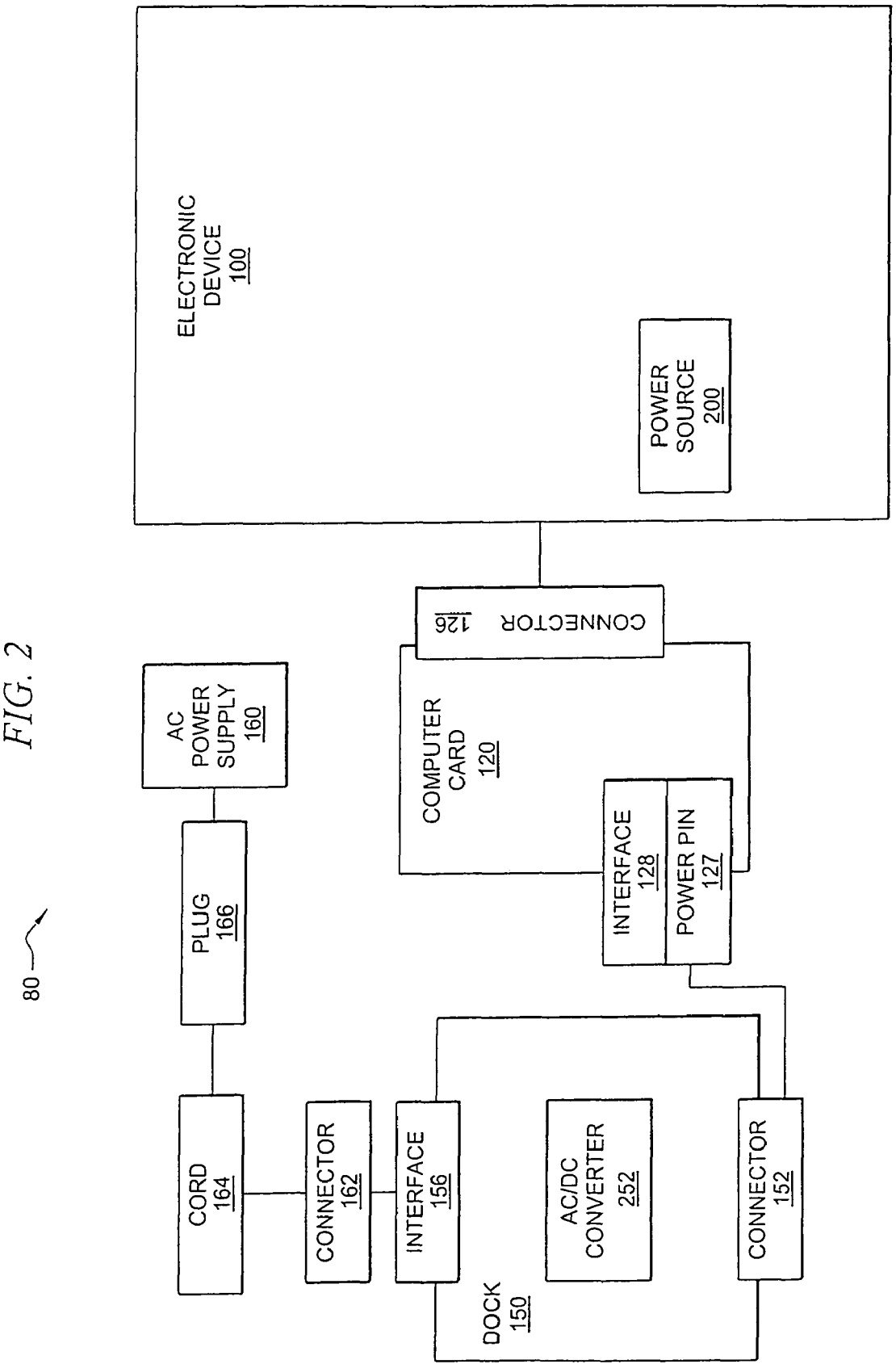
FIG. 2 is a block diagram of the power system of FIG. 1.

FIG. 2 is a block diagram illustrating an embodiment of card-based power system 80. In the illustrated embodiment, computer card 120 is inserted and/or disposed within electronic device 100 (e.g., within slot 114 (FIG. 1)), and dock 150 is coupled directly to computer card 120. Dock 150 is coupled to an AC power supply 160 via plug 166, cord 164, connector 162 and interface 156. In the illustrated embodiment, electronic device 100 comprises an internal power source 200 (e.g., a battery, etc.) which may be recharged using power received from power source 160 via dock 150 and computer card 120. Computer card 120 is coupled to electronic device via connector 126. In the illustrated embodiment, power pin 127 of computer card 120 is coupled to power source 200 of electronic device 100. However, it should be understood that power pin 127 may be coupled to other circuitry within electronic device 100 to enable power to be provided to electronic device 100 and/or to enable a recharging of power source 200. In FIG. 2, dock 150 comprises an AC/DC converter for converting AC power to DC power.

Thus, in operation, embodiments of system 80 enable computer card 120 to provide a connection to a dock for electronic device 100 while also enabling a power supply to be provided to electronic device 100. Thus, embodiments of computer card 120 may be manufactured by providing a connector adapted to enable the computer card to communicatively couple to an electronic device when the computer card is inserted into an externally accessible slot of the electronic device. The method also comprises providing a direct current interface adapted to couple an external power source to the electronic device. The method further comprises providing the direct current interface adapted to enable a dock coupled to the direct current interface to operate when the computer card is inserted into the externally accessible slot of the electronic device. The method further comprises providing the direct current interface adapted to provide power from the electronic device to a dock coupled to the direct current interface when the computer card is inserted into an externally accessible slot of the electronic device. The method also comprises providing the direct current interface adapted to receive power from the dock such that an internal power source for the electronic device is charged. The method additionally comprises providing the direct current interface is adapted to enable a dock to operate when the electronic device is in an off state and the dock is coupled to the direct current interface on the computer card communicatively coupled to the electronic device. The method further comprises coupling a direct current pin to the direct current interface to enable the direct current pin to transfer signals between the electronic device and the external power source.

Embodiments of card-based power system 80 is configured to provide current and/or power to electronic device 100 from a power-providing device. Card-based power system 80 provides power sufficient to operate both computer card 120, a power-providing device (e.g., dock 90), and any peripheral devices coupled to the power-providing device. Furthermore, card-based power system 80 eliminates the hassle and/or need for multiple interfaces and power supplies by providing a single interface configured to accept both a power-providing device and a power source.

What is claimed is:

1. A computer card, comprising:
   a housing insertable into a slot of an electronic device;
   an interface port that connects to and receives power from an external power supply external from the electronic device; and
   a power pin that provides the power from the external power supply to the electronic device.

2. The computer card of claim 1, wherein the power pin is configured to deliver a direct current (DC) power to the electronic device.

3. The computer card of claim 1, wherein the interface port couples plural different peripheral devices to the electronic device.

4. The computer card of claim 1, wherein the interface port connects to the power pin and receives direct current (DC) power from the external power supply.

5. A method of manufacturing a computer card, comprising:
   providing a housing insertable within a slot of an electronic device;
   providing an interface port that receives power from an external power supply that is external from the electronic device; and
   providing a power pin that is connected to the interface port and configured to communicate the power from the external power supply to the electronic device.

6. The method of claim 5, further comprising providing the power pin configured to deliver direct current power from the external power supply to the electronic device.

7. The method of claim 5, wherein the interface port couples plural different peripheral devices to the electronic device through the interface port.

8. The method of claim 5, wherein the interface port connects to a cable that connects to the external power supply.

9. A computer card, comprising:
   means for enabling insertion of the computer card within a slot of an electronic device;
   means for connecting to and receiving power from an external dock that is external to the electronic device; and
   means for communicating the power from the external dock to the electronic device.

10. The computer card of claim 9, wherein the means for connecting is located on an external portion of the computer card when the computer card is inserted into the electronic device.

11. The computer card of claim 9, wherein the means for connecting couples to a cable that receives direct current (DC) power from the external dock.

* * * * *